March 27, 1962 J. ARVAN 3,026,790
FRYING APPARATUS
Filed July 22, 1960 2 Sheets-Sheet 1

INVENTOR.
John Arvan
BY
*Irving Seidman*
ATTORNEY

March 27, 1962 J. ARVAN 3,026,790
FRYING APPARATUS
Filed July 22, 1960 2 Sheets-Sheet 2
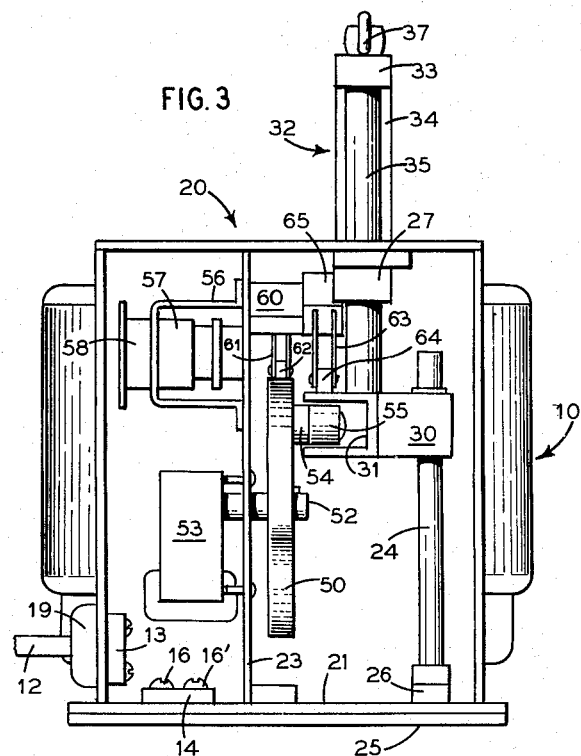
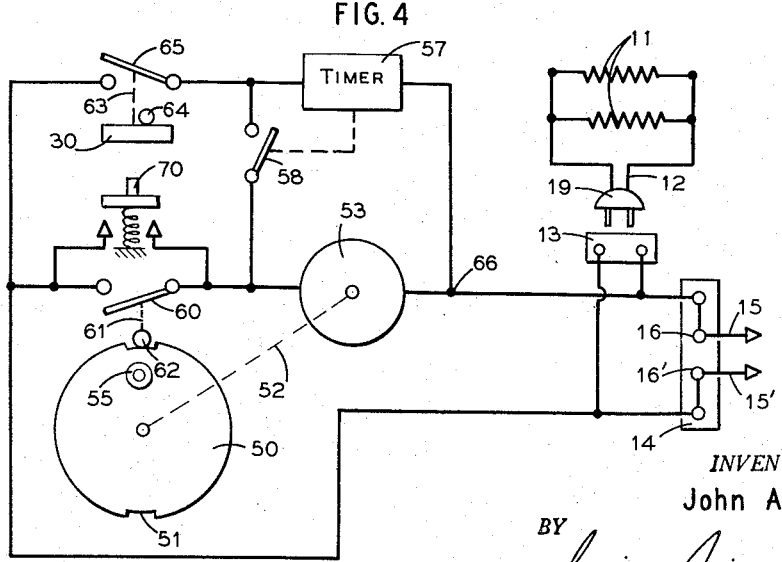
INVENTOR.
John Arvan
BY
Irving Seidman
ATTORNEY

United States Patent Office 3,026,790
Patented Mar. 27, 1962

3,026,790
FRYING APPARATUS
John Arvan, 60 S. Regent St., Port Chester, N.Y.
Filed July 22, 1960, Ser. No. 44,746
6 Claims. (Cl. 99—336)

This invention relates to frying apparatus and, more particularly, to an improved and simplified timer controlled automatic deep fat frier.

In the normal use of a deep fat frier, the food to be fried is placed in a perforated holder or basket and dipped into the hot liquid cooking fat. If the food item is one which is lighter than the cooking oil or fat, it will rise to the surface of the oil, so that some means must be used to hold such a food item submerged for thorough cooking thereof. Also, considerable care must be used to avoid splashing or spattering of the hot oil when placing food items in the frier or removing them therefrom. All of these requirements have posed substantial difficulties preventing development of simple and relatively inexpensive automation equipment for deep fat friers.

In my copending application Serial No. 34,508, filed June 7, 1960, I have shown and described automatic mechanism for effecting and controlling the cooking cycle of a deep fat frier. The present invention is directed to automatic mechanism having the same general function and theory of operation as that of said copending application but of a somewhat simpler and less expensive nature. To the extent that the present invention includes certain features in common with the apparatus of said copending application, the present application is a continuation in part of said copending application.

More particularly, the present invention includes a perforated basket which is reciprocable vertically into and out of the cooking oil in a deep fat frier, and which has a hinged and preferably perforated hinged cover which is gradually swung open as the basket approaches its upper limiting position and gradually swung closed as the basket is moved downwardly. The cover is easily removed when it is desired to fry food items which, during cooking, remain submerged in the cooking oil due to their weight.

The basket is disengageably supported on a laterally projecting arm or bracket secured to the upper end of a plunger mounted for vertical reciprocation in a control mechanism housing supported on a base to which the thermostatically controlled deep fat frier is disengageably secured adjacent the housing. This housing includes a bottom wall vertical side and end walls, a top wall, and a vertical partition, one side or end wall being relatively easily removable for access to the control mechanism.

The housing bottom wall supports a pair of vertical columns or guide posts in spaced, substantially parallel relation to the partition, a slide being reciprocable on the columns and extending horizontally and substantially parallel to the partition. The base of the plunger is secured to the slide, and the plunger extends through an opening in the top wall of the housing.

A substantially circular operating disk is secured to the end of a drive shaft rotatably mounted through the partition. This disk is rotated by an electric motor mounted on the partition and connected to the other end of the drive shaft, preferably through reduction gearing. The disk, which is on the side of the partition facing the slide, carries a radially offset or eccentric roller engaged in a channel portion of the slide facing the disk. Thus, as the disk is rotated, the slide and plunger are vertically reciprocated.

The disk has a pair of substantially diametrically opposite depressions in its periphery, cooperable with a roller on the operator of a first normally open switch mounted on the partition. This switch is in series in the motor energizing circuit and is closed when the roller on its operator engages any part of the disk periphery except the depressions. The roller rides into one of these depressions at each limit of movement of the slide to thus open this switch twice during each complete rotation of the disk.

Time control of the cooking cycle is provided by a timer controlled by a switch operated by the slide and, in turn, controlling re-energization of the motor after the main motor switch is opened when the slide reaches its lower limit of movement.

The cover is hinged to the basket support arm and is opened and closed by a lever pivoted intermediate its ends on this arm and having one end connected by a link to the cover and the other end connected by flexible means, preferably a short chain, to the housing top wall. As the basket is lowered, such other end of the lever engages the top wall to gradually close the cover. As the basket is raised, the chain is tautened to pivot the lever to gradually open the cover.

For an understanding of the invention principles, reference is made to the following description of a typical embodiment thereof as illustrated in the accompanying drawing. In the drawing:

FIG. 3 is an end elevation view of the apparatus, with a housing side wall removed; and FIG. 4 is a schematic wiring diagram of the control circuits.

Figure 1:
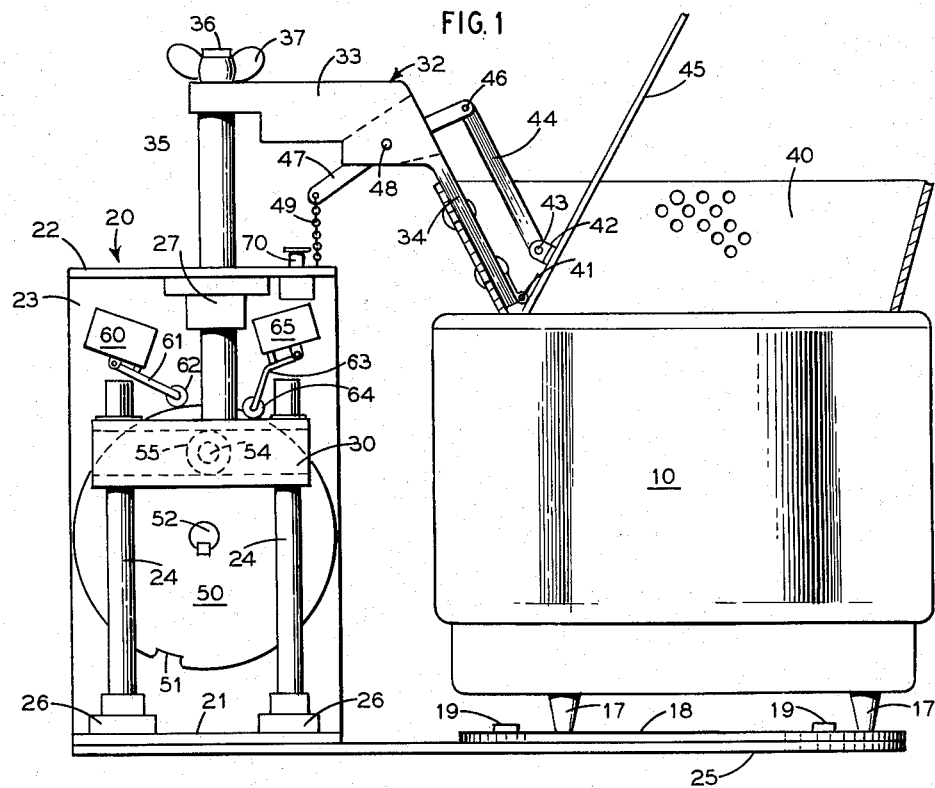
FIGS. 1 and 2 are side elevation views of the apparatus with a housing end wall removed, illustrating the two limiting positions of the basket.
Figure 2:
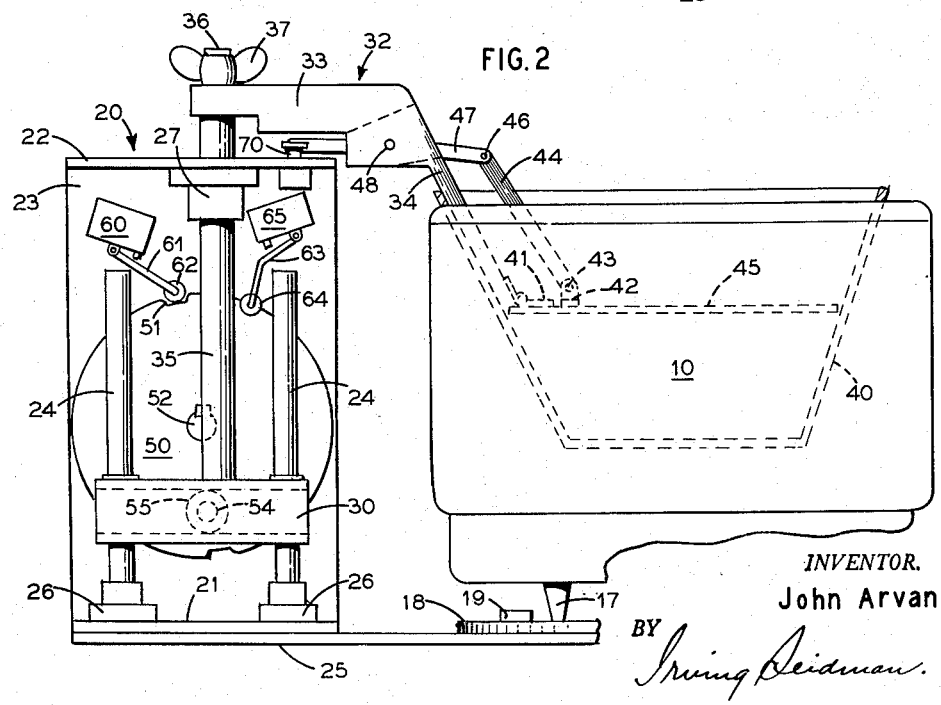

Referring to the drawings, the apparatus includes a deep fat frier 10 which may be a commercial frier of any known make or construction electrically heated by heating coils 11 (FIG. 4) in its base and with the temperature of the cooking oil controlled by a suitable thermostat selector switch (not shown). Electric power is supplied to frier 10 by a cord 12 having a plug connected to a receptacle 13 mounted on an end wall of housing 20 containing the automatic control mechanism. Receptacle 13 is connected to a terminal strip 14 on bottom wall 21 of the housing, main supply conductors 15, 15' being connected to input terminals 16, 16' on strip 14.

For use in the invention apparatus, frier or tank 10, which is preferably stainless steel, has legs 17 secured to a preferably circular plate 18 having a pair of apertures receiving studs 19 disengageably securing plate 18 to the main support or mounting base 25 of the apparatus. Tank 10 is thus easily removable for cleaning. A perforated basket 40, having a hinged perforated cover 45, is reciprocable vertically of tank 10 in a manner to be described. Basket 40 and cover 45 are also preferably of stainless steel for cleanliness and easy cleaning.

The control mechanism is mounted in and on housing 20, which includes a top wall 22 and a vertical partition 23 intermediate its end walls. A pair of vertical columns 24 have bases or pedestals 26 secured to wall 21 between one end wall and partition 23. A cross slide 30 is apertured for reciprocation on columns or posts 24 and, as best seen in FIG. 3, includes a horizontal channel 31 facing partition 23. A plunger 35 is secured to slide 30 and extends in vertical slidable relation through a guide or bearing 27 on top wall 22. The upper end of plunger 35 is reduced and threaded, as at 36, to receive a wing nut 37.

A bent bracket 32 has a horizontal arm 33 aperture to receive reduced portion 36 of plunger 35, and is held against the shoulder thus formed on plunger 35 by the wing nut 37. Bracket or arm 32 has a downwardly and outwardly sloping portion 34 secured to the sloping wall of basket 40 by suitable fasteners. A slot 39 is formed through bracket 32 at the junction of portions 33 and 34.

A hinge 41 is secured to the end of arm portion 34 and to cover 45 somewhat inwardly of its periphery. Inwardly of hinge 41, a fork bracket 42 is secured to cover 45 and connected by a pin 43 to a link 44. Link 44 is connected by a pin 46 to one end of a lever 47 extending through slot 39 and pivoted intermediate its ends on a pin 48 in arm 32. A short chain 49 connects the other end of lever 47 to top wall 22 of housing 20.

The main element of the operating mechanism is a generally circular disk 50 having a pair of diametrically opposite recesses 51 in its periphery. Disk 50 is keyed to a horizontal shaft 52 rotatably mounted through partition 23. Shaft 52 is rotated by a low horsepower motor 53 mounted on the opposite surface of partition 23 and preferably driving shaft 52 through reduction gearing. Adjacent but radially inward of one recess 51, a pin 54 projects from disk 50 toward slide 30 and rotatably mounts a roller 55 having a diameter slightly less than the internal width of channel 31. Thus, as shaft 52 is rotated by motor 53, slide 30, and thus plunger 35 and basket 40, are vertically reciprocated.

A normally open switch 60 is mounted on partition 23 and has an operator 61 carrying a roller 62 engaged with the periphery of disk 50. A normally closed switch 65 is also mounted on partition 23 and has an operator 63 carrying a roller 64 engageable with slide 30 at the upper limit of movement of the latter.

A bracket 56 on partition 23 supports a timer 57 including a switch 58. Timer 57 is presettable for the desired cooking time. A starting push button 70 is mounted on top wall 22 of housing 20.

Referring to FIG. 4, motor 53 and switch 60 are connected in series between terminals 16 and 16', and timer 57 and switch 65 are also connected in series between these terminals. These two series circuits are in parallel with each other. Timer switch 58 is connected between the junction point 66 of motor 53 and switch 60 and the junction point of timer 57 and switch 65. Push button 70 is in shunt with switch 60.

To start the apparatus, plug 19 is engaged in receptacle 13 and the heating coils are energized to heat the cooking oil to the temperature pre-set by the thermostat control switch of tank 10. The parts now occupy the position of FIG. 1, with basket 40 raised and cover 45 open.

When the oil is heated to the correct temperature, the food items to be cooked are placed in basket 40 and push button 70 is depressed. This closes the energizing circuit of motor 53 and the motor starts to rotate disk 50. Almost immediately, roller 62 rides out of a recess 51 and closes switch 60 through operator 61. If push button 70 is now released, motor 53 remains energized and continues to rotate disk 50.

As disk 50 is rotated, roller 55 moves slide 30 downwardly along guides 24. Slide 30 disengages roller 64 and switch 65 closes to energize timer 57. Plunger 35 and basket 40 move downwardly and cover 45 starts to close by gravity under the control of chain 49 acting through lever 47. As basket 40 and slide 30 reach their lower limit of movement, roller 62 of switch 60 rides into the other recess 51 of disk 50, and switch 60 opens to break the motor energizing circuit. Rotation of disk 50 ceases, as timer switch 58 is not closed until the end of the time interval pre-set on timer 57. The food items in basket 40 thus remain submerged in the cooking oil for the pre-set time interval.

At the end of this interval, timer 57 closes its switch 58 to re-energize motor 53. Disk 50 is then rotated to raise slide 30 through roller 55. Roller 62 rides out of recess 51 to re-close switch 60. As basket 45 rises, chain 49 is extended to swing lever 47 to open cover 45 gradually. At the upper limit of movement of slide 30 and basket 40, slide 30 engages roller 64 to open switch 65 and roller 62 rides into recess 51 to open switch 60, thus breaking both energizing circuits for motor 53. As timer 57 re-sets, it re-opens switch 58.

By removing pins 41 and 46, cover 45 is readily detached for cleaning or when not needed. The bracket and cover assembly is readily removed for cleaning by removing nut 37 and disengaging chain 49.

While a specific embodiment of the invention has been shown and described in detail to illustrate the application of the invention principles, it will be understood that the invention may be embodied otherwise without departing from such principles.

What is claimed is:

1. Deep fat frying apparatus comprising, in combination, an electrically heated deep fat frying tank; a support structure mounting said tank; slide means reciprocable vertically of said support structure; a perforated basket secured to said slide means for vertical reciprocation relative to cooking oil in said tank; mechanism operable to reciprocate said slide; an electric motor for driving said mechanism; a first energizing circuit for said motor closed, responsive to actuation of a manual switch, to energize said motor for downward movement of said basket; means operable to open said first circuit when the basket reaches its lower limit of movement; a timer energized responsive to downward movement of said slide; a second energizing circuit for said motor closed by said timer at the end of a pre-set time interval to energize said circuit for upward movement of said basket; and means operable to open said second circuit when the basket reaches its upper limit of movement; said first circuit including a normally open first switch in shunt with said manual switch, said normally open switch being closed by said mechanism as said basket starts downwardly and being opened by said mechanism at the limit of downward movement of said basket.

2. Deep fat frying apparatus comprising, in combination, an eletrically heated deep fat frying tank; a support structure mounting said tank; slide means reciprocal vertically of said support structure; a perforated basket secured to said slide means for vertical reciprocation relative to cooking oil in said tank; mechanism operable to reciprocate said slide; an electric motor for driving said mechanism; a first energizing circuit for said motor closed, responsive to actuation of a manual switch to energize said motor for downward movement of said basket; means operable to open said first circuit when the basket reaches its lower limit of movement; a timer energized responsive to downward movement of said slide means; a second energizing circuit for said motor closed by said timer at the end of a pre-set time interval to energize such circuit for upward movement of said basket; means operable to open said second circuit when the basket reaches its upper limit of movement; and a normally closed second switch controlling energization of said timer and opened by said slide means at the upper limit of movement of the latter; said normally closed switch being in series in said second circuit.

3. Deep fat frying apparatus as claimed in claim 2 including a normally open timer operated third switch closed at the end of said time interval, said second and third switches being connected in series.

4. Deep fat frying apparatus as claimed in claim 1 in which said slide means includes a slide and a basket support arm connected to said slide; said mechanism including is a disk carrying an eccentric roller engaged with said slide; said disk having a pair of diametrically opposite recesses in its periphery; said first switch including a roller mounted on an operator and being closed whenever said roller engages the periphery of said disk between said recesses; said second switch being operated by said slide.

5. Deep fat frying apparatus as claimed in claim 1 in which said manual switch is a push button switch.

6. Deep fat frying apparatus as claimed in claim 1, in which said slide means includes a slide; a perforated cover hinged to said basket; linkage inter-connecting said cover and said support structure and effective to close said cover as said basket is moved downwardly and to open said cover as said basket is moved upwardly; a vertical plunger connected to said slide; and an arm extending laterally from said plunger and connected to said basket; said linkage including a lever pivotally connected intermediate its ends to said arm, a link connecting one end of said lever to said cover, and a short chain connecting the other end of said lever to said support structure.

References Cited in the file of this patent

UNITED STATES PATENTS

| | | |
|---|---|---|
| 2,244,168 | Miller | June 3, 1941 |
| 2,307,347 | Anderson | Jan. 5, 1943 |
| 2,546,464 | Martin | Mar. 27, 1951 |
| 2,766,680 | Tagliaferri | Oct. 16, 1956 |
| 2,869,508 | Pelavin | Jan. 20, 1959 |